(12) United States Patent
Kawamura et al.

(10) Patent No.: US 8,821,332 B2
(45) Date of Patent: Sep. 2, 2014

(54) POWER TRANSMISSION DEVICE

(75) Inventors: Kazuya Kawamura, Anjo (JP);
Takayoshi Kato, Handa (JP); Toshihiko Aoki, Anjo (JP); Hiroshi Kato, Kariya (JP); Satoru Kasuya, Nishio (JP)

(73) Assignee: Aisin AW Co., Ltd., Anjo (JP)

( * ) Notice: Subject to any disclaimer, the term of this patent is extended or adjusted under 35 U.S.C. 154(b) by 0 days.

(21) Appl. No.: 13/983,911

(22) PCT Filed: Feb. 29, 2012

(86) PCT No.: PCT/JP2012/055127
§ 371 (c)(1),
(2), (4) Date: Aug. 6, 2013

(87) PCT Pub. No.: WO2012/132738
PCT Pub. Date: Oct. 4, 2012

(65) Prior Publication Data
US 2013/0316866 A1 Nov. 28, 2013

(30) Foreign Application Priority Data

Mar. 31, 2011 (JP) ................................. 2011-080064

(51) Int. Cl.
*F16H 57/04* (2010.01)
*F16D 3/76* (2006.01)
*F16H 57/027* (2012.01)

(52) U.S. Cl.
CPC .......... *F16H 57/027* (2013.01); *F16H 57/0426* (2013.01); *F16H 57/0421* (2013.01)
USPC ............................................. 475/160; 464/17

(58) Field of Classification Search
CPC .................................. F16H 7/027; F16H 7/04
USPC ............................................ 475/160; 464/17
See application file for complete search history.

(56) References Cited

U.S. PATENT DOCUMENTS

| | | | |
|---|---|---|---|
| 2,818,047 A | 12/1957 | Powell | |
| 3,167,332 A * | 1/1965 | Simmers | 285/41 |
| 4,824,264 A | 4/1989 | Hoebel | |
| 4,940,446 A * | 7/1990 | Inui et al. | 474/91 |
| 4,987,795 A | 1/1991 | Nguyen | |
| 5,012,833 A * | 5/1991 | Hunley et al. | 137/15.02 |
| 7,370,729 B2 * | 5/2008 | Okuno et al. | 184/6.23 |
| 2006/0175245 A1 * | 8/2006 | Gerteis et al. | 210/372 |

FOREIGN PATENT DOCUMENTS

| | | |
|---|---|---|
| JP | U-55-36716 | 3/1980 |
| JP | U-61-59811 | 4/1986 |
| JP | A-63-207725 | 8/1988 |

(Continued)

OTHER PUBLICATIONS

Apr. 17, 2012 International Search Report issued in International Application No. PCT/JP2012/055127 (with translation).

*Primary Examiner* — Tisha Lewis
(74) *Attorney, Agent, or Firm* — Oliff PLC (57) ABSTRACT

In a power transmission device, a breather chamber having an opening on its one end side and extending coaxially with the countershaft is formed in a countershaft that transmits power from an output shaft of an automatic transmission to a differential mechanism. An inner end of a vent pipe placed so as to extend through a transmission case and that includes the inner end and an outer end each having an opening is inserted in the opening of the breather chamber. A plug, which closes a gap between an inner peripheral surface of the breather chamber and an outer peripheral surface of the inner end of the vent pipe so as to allow air to flow between the inside of the transmission case and the breather chamber and so as to restrict entrance of hydraulic oil into the breather chamber, is placed in the opening of the breather chamber.

8 Claims, 4 Drawing Sheets

(56) References Cited

FOREIGN PATENT DOCUMENTS

| JP | U-3-73756 | 7/1991 |
| JP | U-4-11921 | 1/1992 |
| JP | U-6-18754 | 3/1994 |
| JP | A-11-101333 | 4/1999 |
| JP | A-2000-55063 | 2/2000 |
| JP | A-2002-156029 | 5/2002 |
| JP | A-2003-161362 | 6/2003 |

* cited by examiner

POWER TRANSMISSION DEVICE

INCORPORATION BY REFERENCE

The disclosure of Japanese Patent Application No. 2011-080064 filed on Mar. 31, 2011 including the specification, drawings and abstract is incorporated herein by reference in its entirety.

BACKGROUND OF THE INVENTION

The present invention relates to power transmission devices including: a shift device that is capable of transmitting power applied to an input shaft to an output shaft by shifting a speed ratio to a plurality of shift speeds by engagement and disengagement of a plurality of hydraulic friction engagement elements; a differential mechanism that is coupled to right and left driving wheels; a countershaft that transmits the power from the output shaft to the differential mechanism; and a case that accommodates the shift device, the differential mechanism, and the countershaft.

DESCRIPTION OF THE RELATED ART

Conventionally, as this type of power transmission devices, a power transmission device is known which uses as a breather chamber a hollow portion of a countershaft that transmits power from an output shaft of a shift device to a differential mechanism, and which has a vent passage that opens in the breather chamber, in order to eliminate a pressure difference between the inside and the outside of the case due to variations in volume of hydraulic oil according to the temperature in the case (see, e.g., Japanese Patent Application Publication No. 2003-161362 (JP 2003-161362 A)). In this power transmission device, hydraulic oil is removed to the outer peripheral side in the breather chamber by a gas-liquid separation action by a centrifugal force that is generated by rotation of the countershaft. This suppresses entrance of the oil into the vent passage that opens in the breather chamber, regardless of an increase in oil level in the case.

SUMMARY OF THE INVENTION

In the conventional power transmission device, however, the hydraulic oil in the case may flow into the breather chamber depending on the attitude of the power transmission device, etc., and the hydraulic oil may be discharged out of the case through the vent passage.

It is a primary object of the power transmission device of the present invention to reliably suppress discharge of oil from a breather chamber through a vent pipe.

The power transmission device of the present invention employs the following means in order to achieve the primary object.

A power transmission device according to an aspect of the present invention includes: a shift device that is capable of transmitting power applied to an input shaft to an output shaft by shifting a speed ratio to a plurality of shift speeds by engagement and disengagement of a plurality of hydraulic friction engagement elements; a differential mechanism that is coupled to right and left driving wheels; a countershaft that transmits the power from the output shaft to the differential mechanism; and a case that accommodates the shift device, the differential mechanism, and the countershaft. A breather chamber having an opening at least on its one end side and extending coaxially with the countershaft is formed in the countershaft, one end of a vent pipe that is placed so as to extend through the case and that has an opening at its both ends is inserted in the opening of the breather chamber, and a plug, which closes a gap between an inner peripheral surface of the breather chamber and an outer peripheral surface of the vent pipe so as to allow air to flow between inside of the case and the breather chamber and so as to restrict entrance of oil into the breather chamber, is placed in the opening of the breather chamber.

In this power transmission device, the breather chamber having the opening at least on its one end side and extending coaxially with the countershaft is formed in the countershaft that transmits the power from the output shaft to the differential mechanism, and the one end of the vent pipe that is placed so as to extend through the case and that has the opening at its both ends is inserted in the opening of the breather chamber. Moreover, the plug, which closes the gap between the inner peripheral surface of the breather chamber and the outer peripheral surface of the vent pipe so as to allow the air to flow between the inside of the case and the breather chamber and so as to restrict entrance of the oil into the breather chamber, is placed in the opening of the breather chamber. This can satisfactorily suppress entrance of the oil into the breather chamber regardless of a change in oil level in the power transmission device, and thus can more reliably suppress discharge of the oil from the breather chamber through the vent pipe.

The one end of the vent pipe may be inserted in the opening so as to extend coaxially with the countershaft, and the plug may form a gap around the vent pipe and may closely contact the inner peripheral surface of the breather chamber. This can more satisfactorily restrict entrance of the oil into the breather chamber while allowing the air to flow between the inside of the case and the breather chamber.

A gear may be formed on an outer periphery of the countershaft, and a through hole extending from the inner peripheral surface of the breather chamber to a tooth bottom of the gear may be formed in the countershaft. Thus, even if the oil flows into the breather chamber, the oil can be first guided to the outer peripheral side in the breather chamber by a gas-liquid separation action by a centrifugal force that is generated by rotation of the countershaft. Then, the oil can be discharged to the gear outside the breather chamber through the through hole, and the discharged oil can be used to lubricate the gear.

Both end portions of the countershaft may be rotatably supported by the case via a bearing, and a discharge port that supplies the oil to the bearing may be provided near the bearing supporting the end portion of the countershaft which is located on the opening side in which the one end of the vent pipe is inserted. Thus, the bearing rotatably supporting the countershaft can be satisfactorily lubricated. Even if the discharge port of the oil is thus provided near the opening of the countershaft (the breather chamber), entrance of the oil into the breather chamber can be satisfactorily suppressed by placing the plug closing the gap between the breather chamber and the outer peripheral surface of the vent pipe.

A drain hole that discharges the oil may be provided near the discharge port of the case. This can more satisfactorily restrict entrance of the oil into the breather chamber while avoiding accumulation of the oil from the discharge port in a space defined by the case, the countershaft, the bearing, and the plug. Even if the hydraulic oil flows into a region around the vent pipe through the drain hole due to a change in oil level in the power transmission device, entrance of the oil into the breather chamber can be satisfactorily restricted by the plug.

A lubricating plug having an oil flow hole may be mounted in the discharge port of the case. Thus, a proper amount of oil can be supplied from the discharge port to the bearing side by adjusting the axial length and the diameter of the oil flow hole of the lubricating plug. This can more reliably suppress accumulation of the oil in the space defined by the case, the countershaft, the bearing, and the plug.

The oil flow hole of the lubricating plug may have a diameter smaller than an axial length of the oil flow hole. The lubricating plug may have an increased diameter hole that communicates with the oil flow hole and that opens on the bearing side, and the axial length of the oil flow hole may be larger than that of the increased diameter hole. Thus, a more proper pipe resistance can be obtained in the lubricating plug, and the oil can be supplied from the discharge hole to the bearing while avoiding accumulation of the oil in the space defined by the case, the countershaft, the bearing, and the plug.

DETAILED DESCRIPTION OF THE EMBODIMENTS

A mode for carrying out the present invention will be described below based on an embodiment.

Figure 1:
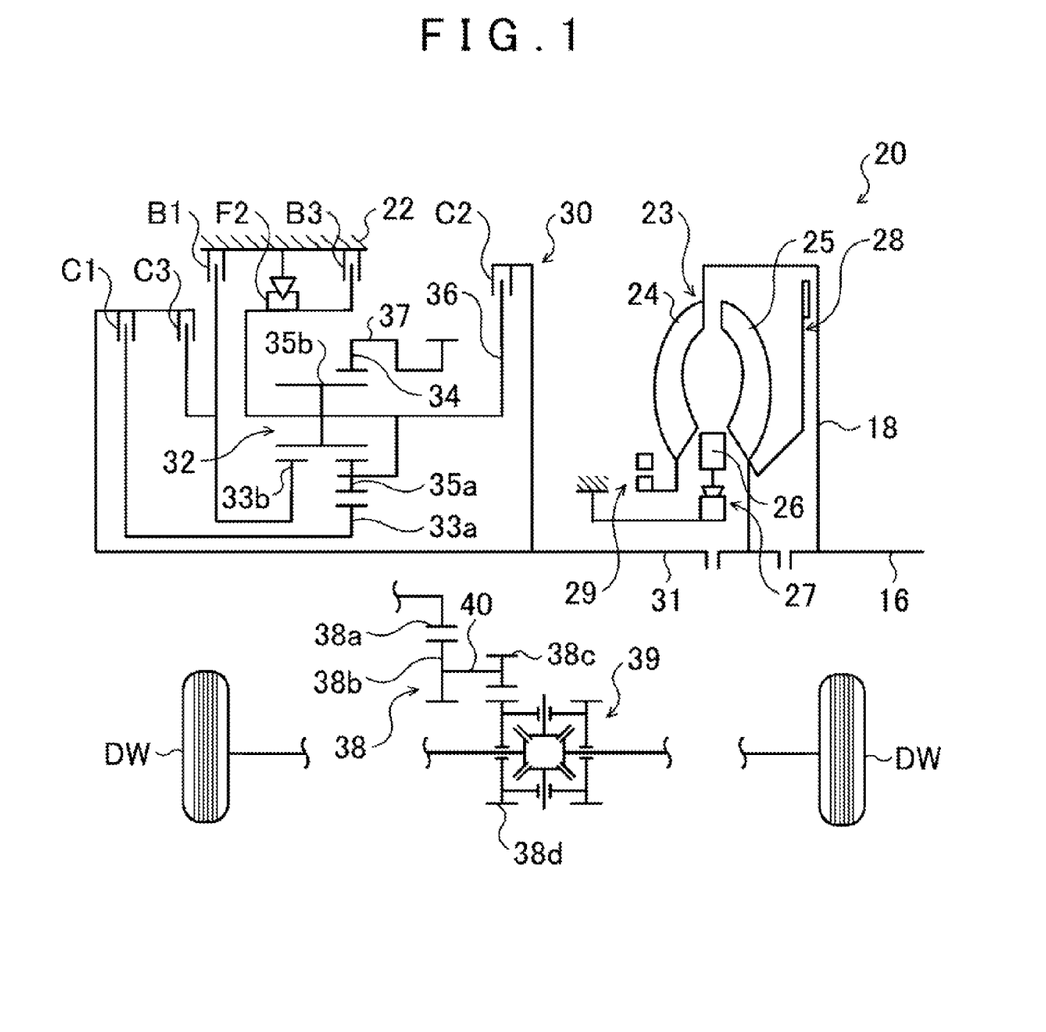
FIG. 1 is a schematic configuration view of a power transmission device 20.

FIG. 1 is a schematic configuration view of a power transmission device 20 according to an embodiment of the present invention. The power transmission device 20 shown in FIG. 1 is mounted on a front-wheel drive automobile, and transmits power from an engine, not shown, to right and left driving wheels DW. The power transmission device 20 has a hydraulic transmission device (starting device) 23, an oil pump 29 as an oil-pressure generating source, a stepped automatic transmission 30, a gear mechanism 38, a differential mechanism 39, a hydraulic control device, not shown, which supplies and discharges hydraulic oil (working fluid) to and from these elements, and a shifting electronic control unit, not shown, which controls these elements, etc., which are accommodated in a transmission case 22.

The hydraulic transmission device 23 is configured as a hydraulic torque converter with a lockup clutch. As shown in FIG. 1, the hydraulic transmission device 23 includes a pump impeller 24 that is connected to a crankshaft 16 of the engine, not shown, via a front cover 18, a turbine runner 25 that is fixed to an input shaft (power input member) 31 of the automatic transmission 30 via a turbine hub, a stator 26 that is placed inside the pump impeller 24 and the turbine runner 25 and adjusts the flow of hydraulic oil (ATF) from the turbine runner 25 to the pump impeller 24, a one-way clutch 27 that limits the rotation direction of the stator 26 to one direction, a lockup clutch 28 having a damper mechanism, not shown, etc. The hydraulic transmission device 23 functions as a torque amplifier by the action of the stator 26 when the rotational speed difference between the pump impeller 24 and the turbine runner 25 is large, and functions as a fluid coupling when this rotational speed difference is small. The lockup clutch 28 is capable of performing a lockup operation of directly coupling the front cover 18 and the input shaft 31 of the automatic transmission 30, and is capable of cancelling the lockup. If predetermined lockup-on conditions are satisfied after the automobile is started, the front cover 18 and the input shaft 31 of the automatic transmission 30 are directly coupled (locked up) by the lockup clutch 28, so that power from the engine is mechanically and directly transmitted to the input shaft 31. At this time, variations in torque that is transferred to the input shaft 31 are absorbed by a damper mechanism, not shown.

The automatic transmission 30 is configured as, e.g., a four-speed transmission, and as shown in FIG. 1, includes a Ravigneaux type planetary gear mechanism 32, and a plurality of clutches C1, C2, and C3, two brakes B1, B3, and a one-way clutch F2 which are used to change a power transmission path from the input side to the output side. The Ravigneaux type planetary gear mechanism 32 has: two sun gears 33a, 33b as external gears; a ring gear 34 as an internal gear fixed to an output shaft (power output member) 37 of the automatic transmission 30; a plurality of short pinion gears 35a meshing with the sun gear 33a; a plurality of long pinion gears 35b meshing with the sun gear 33b and the plurality of short pinion gears 35a and meshing with the ring gear 34; and a carrier 36 that holds the plurality of short pinion gears 35a and the plurality of long pinion gears 35b, which are coupled to each other, in a rotatable and revolvable manner, and that is supported by the transmission case 2 via the one-way clutch F2. The output shaft 37 of the automatic transmission 30 is connected to the driving wheels DW via the gear mechanism 38 and the differential mechanism 39. It should be understood that the automatic transmission 30 is not limited to the four-speed transmission, and can be a transmission having any shift speeds such as, e.g., an eight-speed transmission.

The gear mechanism 38 includes: a counter drive gear 38a fixed to the output shaft 37 of the automatic transmission 30; a counter driven gear 38b that is fixed to one end side of a countershaft 40 extending parallel to the output shaft 37 and meshes with the counter drive gear 38a; a drive pinion gear (final drive gear) 38c formed (or fixed) on the other end side of the countershaft 40; and a differential ring gear (final driven gear) 38d that meshes with the drive pinion gear 38c and is coupled to the differential mechanism 39.

The clutch C1 is a hydraulic clutch capable of coupling the input shaft 31 and the sun gear 33a of the Ravigneaux type planetary gear mechanism 32 and uncoupling the input shaft 31 and the sun gear 33a. The clutch C2 is a hydraulic clutch capable of coupling the input shaft 31 and the carrier 36 of the Ravigneaux type planetary gear mechanism 32 and uncoupling the input shaft 31 and the carrier 36. The clutch C3 is a hydraulic clutch capable of coupling the input shaft 31 and the sun gear 33b of the Ravigneaux type planetary gear mechanism 32 and uncoupling the input shaft 31 and the sun gear 33b. The brake B1 is a hydraulic clutch capable of holding the sun gear 33b of the Ravigneaux type planetary gear mechanism 32 stationary to the transmission case 22 and canceling such holding of the sun gear 33b from the transmission case 22. The brake B3 is a hydraulic clutch capable of holding the carrier 36 of the Ravigneaux type planetary gear mechanism 32 stationary to the transmission case 22 and canceling such holding of the carrier 36 from the transmission case 22. The clutches C1 to C3 and the brakes B1, B3 operate in response to supply/discharge of the hydraulic oil by the hydraulic control device.

Figure 2:
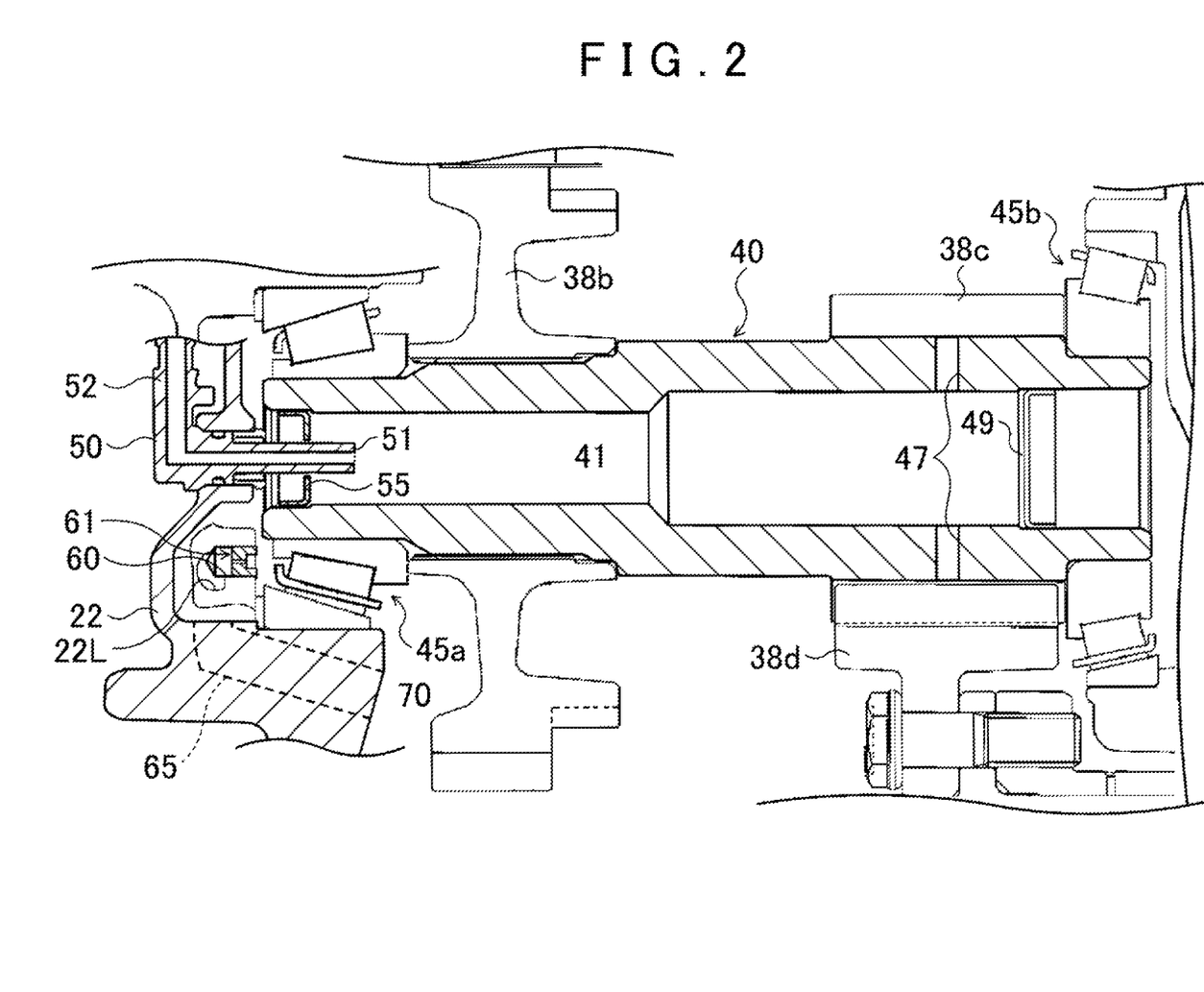
FIG. 2 is an enlarged view showing a region around a countershaft.
Figure 3:
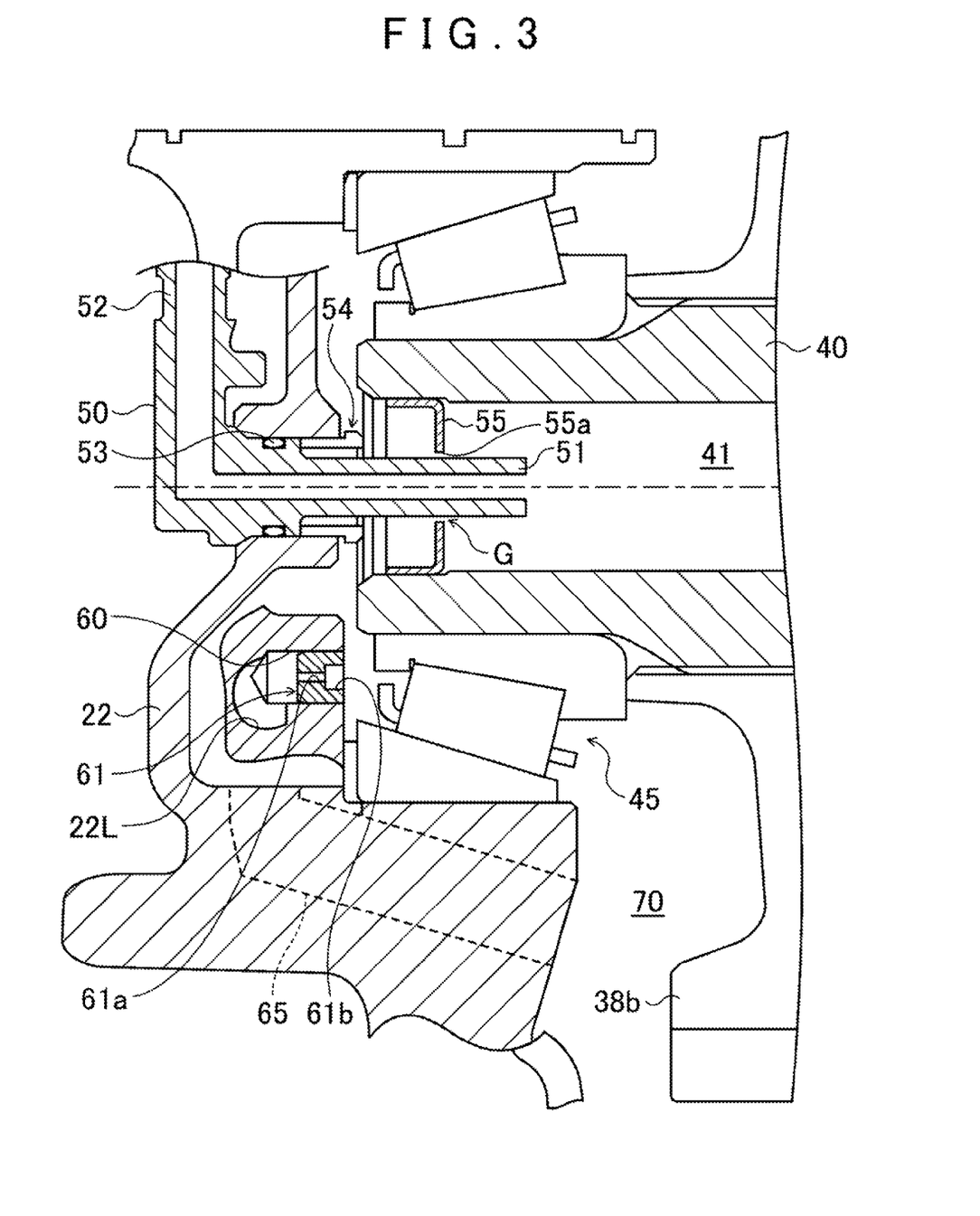
FIG. 3 is an enlarged sectional view showing a main part of the power transmission device 20.

FIG. 2 is an enlarged view showing a region around the countershaft 40, and FIG. 3 is an enlarged sectional view showing a main part of the power transmission device 20. As shown in these figures, both ends of the countershaft 40 are rotatably supported in the transmission case 22 via a pair of bearings 45a, 45b so as to extend parallel to the input shaft 31 of the automatic transmission 30. A discharge port (oil passage) 60, which communicates with a lubricant passage 22L formed in the transmission case 20 to supply hydraulic oil from the lubricant passage 22L to the bearing 45a as a lubricating/cooling medium, is provided near the bearing 45a of the transmission case 22. This allows the bearing 45a rotatably supporting the countershaft 40 to be satisfactorily lubricated. A discharge port (oil passage), not shown, that supplies hydraulic oil to the bearing 45b is also provided near the bearing 45b of the transmission case 22. A drain hole 65 that discharges the hydraulic oil to a space 70 (see FIGS. 2 and 3) in a lower part of the transmission case 22 without causing the hydraulic oil to flow through the bearing 45a is provided near the discharge port 60 of the transmission case 22.

Figure 4:
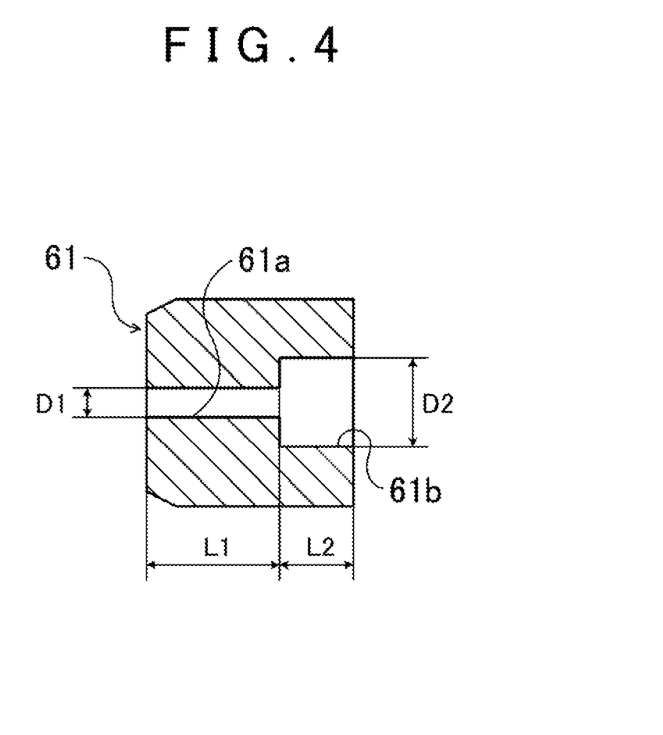
FIG. 4 is a sectional view showing a lubricating plug 61.

As shown in FIG. 3, a lubricating plug 61 is mounted in the discharge port 60 of the transmission case 22. As shown in FIGS. 3 and 4, the lubricating plug 61 has an oil flow hole 61a that opens on one end (left end in FIGS. 3 and 4) side of the lubricating plug 61, namely on the lubricant passage 22L side of the lubricating plug 61, and an increased diameter hole 61b that communicates with the oil flow hole 61a and opens on the other end (right end in FIGS. 3 and 4) side of the lubricating plug 61, namely on the bearing 45a side of the lubricating plug 61. As shown in the figures, the diameter of the increased diameter hole 61b is increased with respect to the oil flow hole 61a, and the increased diameter hole 61b has a diameter D2 larger than a diameter D1 of the oil flow hole 61a (D2>D1). A portion of the lubricating plug 61 which includes the oil flow hole 61a (a portion on the lubricant passage 22L side of the increased diameter hole 61b) thus functions as an orifice. In the embodiment, the diameter D1 and axial length L1 of the oil flow hole 61a and the diameter D2 and axial length L2 of the increased diameter hole 61b are determined so that the flow rate of the hydraulic oil flowing through the oil flow hole 61a etc. is lower than a minimum flow rate of the hydraulic oil in the bearing 45a (flow rate of the hydraulic oil when rotation of the countershaft 40 is stopped at extremely low temperatures). Specifically, as shown in FIG. 4, these dimensions are determined so that the diameter D1 of the oil flow hole 61a is smaller than the axial length L1 thereof (D1<L1) and the axial length L1 of the oil flow hole 61a is larger than the axial length L2 of the increased diameter hole 61b (L1>L2). Since such a lubricating plug 61 is mounted in the discharge port 60, a proper amount of hydraulic oil can be easily supplied as a lubricating/cooling medium to the bearing 45a through the discharge port 60.

The countershaft 40 is a hollow shaft, and has a central hole (through hole) extending coaxially with the countershaft 40. In the power transmission device 20 of the embodiment, the central hole of the countershaft 40 serves as a breather chamber 41 that eliminates, by so-called breathing, the pressure difference between the inside and the outside of the case, which is caused by variations in volume of the hydraulic oil according to the temperature in the transmission case 22. The countershaft 40 has a plurality of through holes 47 formed from the inner peripheral surface of the breather chamber 41 (central hole) to the outer periphery thereof and extending to the tooth bottom of the drive pinion gear 38c.

An opening on the drive pinion gear 38c side (right side in the figure) of the breather chamber 41, namely the central hole of the countershaft 40, is closed by a closing member 49 so as not to allow the lubricating hydraulic oil that is supplied to the bearing 45b on the right side in the figure to flow into the opening. One end of a vent pipe 50 that is fixed to the transmission case 22 so as to extend through the transmission case 22 is inserted in an opening on the counter driven gear 38b side (left side in the figure) of the breather chamber 41, namely the central hole of the countershaft 40. In the embodiment, the vent pipe 50 is made of a resin etc. so as to have an approximately L shape, and has an inner end 51 and an outer end 52 each having an opening. As shown in FIGS. 2 and 3, the inner end 51 of the vent pipe 50 is inserted in the opening of the breather chamber 41 so as to extend coaxially with the countershaft 40, namely the breather chamber 41. The outer end 52 of the vent pipe 50 is connected to the other end of a hose, not shown, that has its one end opened to the atmosphere and that is fixed to the outer surface of the transmission case 22. The breather chamber 41 thus communicates with the outside of the transmission case 22, namely the atmosphere, through the vent pipe 50 and the hose. Moreover, a seal member 53 such as an O-ring is placed between the vent pipe 50 and the transmission case 22, and an oil passage 54 (see FIG. 3) that allows the hydraulic oil to flow from above to below in the figure is formed between the inner surface of the transmission case 22 and the left end surface of the countershaft 40 in the figure so as to extend around the inner end 51 of the vent pipe 50.

As shown in FIGS. 2 and 3, a plug 55 is mounted in the opening on the counter driven gear 38b side (left side in the figure) of the breather chamber 41, namely the central hole of the countershaft 40. The plug 55 is formed as a bottomed cylindrical body made of a metal etc., and an opening 55a having a dimension (diameter) larger than the outer diameter (outer dimension) of the inner end 51 of the vent pipe 50 is formed in the bottom of the plug 55. The plug 55 is press-fitted in the opening on the counter driven gear 38b side (left side in the figure) of the central hole of the countershaft 40 such that the inner end 51 of the vent pipe 50 is inserted through the opening 55a. The plug 55 thus forms a gap G (see FIG. 3) around the inner end 51 of the vent pipe 50, and closely contacts the inner peripheral surface of the breather chamber 41. That is, the plug 55 that is mounted in the opening of the breather chamber 41 closes a gap between the inner peripheral surface of the breather chamber 41 and the outer peripheral surface of the inner end 51 of the vent pipe 50 so as to allow air to flow between the inside of the transmission case 22 and the breather chamber 41 and so as to restrict entrance of the hydraulic oil into the breather chamber 41.

In the power transmission device 20 configured as described above, the breather chamber 41 formed in the countershaft 40 communicates with the inside of the transmission case 22, namely a region where the clutches C1 to C3, the brakes B1, B3, the one-way clutch F2, the Ravigneaux type planetary gear mechanism 32, etc. are arranged, etc., through the gap G, a gap formed around the bearing 45a, etc., and communicates with the outside of the transmission case 22, namely the atmosphere, through the vent pipe 50 and the hose, not shown. Thus, if a pressure difference is generated between the inside and the outside of the case due to variations in volume of the hydraulic oil according to the temperature in the transmission case 22, air flows between the inside and the outside of the case through the breather chamber 41 by the so-called breathing action, whereby the pressure difference can be reduced.

During operation of the power transmission device 20, hydraulic oil as a lubricating/cooling medium is supplied from the upper part of the transmission case 22 to the bearing 45a supporting the countershaft 40. However, since such a plug 55 as described above is mounted in the opening of the breather chamber 41 formed in the countershaft 40, entrance of the hydraulic oil, flowing from above in the figure to a region around the vent pipe 50, into the breather chamber 41 is restricted by the plug 55, and this hydraulic oil flows downward in the figure through the oil passage 54. The hydraulic oil is also supplied from the discharge port 60 to the bearing 45a, entrance of the hydraulic oil into the breather chamber 41 is restricted by the plug 55, and the hydraulic oil flowing from the discharge port 60 or the upper part of the transmission case 22 is discharged to the space 70 in the lower part of the transmission case 22 through a gap such as a gap of a roller of the bearing 45a, or is discharged to the space 70 side through the drain hole 65 formed in the transmission case 22. The drain hole 65 is thus formed near the bearing 45a in the transmission case 22, Accordingly, even if the viscosity of the hydraulic oil or the oil level in the power transmission device 20 varies, the hydraulic oil is not accumulated in a space defined by the transmission case 22, the bearing 45a, the countershaft 40, and the plug 55, and entrance of the hydraulic oil into the breather chamber 41 can be more satisfactorily restricted. Even if oil in the power transmission device 20 becomes uneven and the oil level in the transmission case 22 varies temporarily during turning of the automobile 10 etc., and the hydraulic oil flows from the space 70 side in the lower part of the figure into the region around the vent pipe 50 through the drain hole 65 or the bearing 45a, entrance of this hydraulic oil into the breather chamber 41 can be restricted by the plug 55. In the power transmission device 20 of the embodiment, even if hydraulic oil flows into the breather chamber 41, the hydraulic oil can be first guided to the outer peripheral side in the breather chamber 41 by the gas-liquid separation action by the centrifugal force that is generated by rotation of the countershaft 40. Then, the hydraulic oil can be discharged to the drive pinion gear 38c outside the breather chamber 41 through the plurality of through holes 47, and the discharged oil can be used to lubricate the drive pinion gear 38c.

Moreover, in the power transmission device 20, the lubricating plug 61 having the oil flow hole 61a and the increased diameter hole 61b is mounted in the discharge port 60 of the hydraulic oil which is provided near the bearing 45a, and the diameter D1 and the axial length L1 of the oil flow hole 61a and the diameter D2 and the axial length L2 of the increased diameter hole 61b are determined so that the flow rate of the hydraulic oil flowing through the oil flow hole 61a etc. is lower than the minimum flow rate of the hydraulic oil in the bearing 45a. Thus, even if the hydraulic oil as a lubricating/cooling medium is supplied from the discharge port 60 to the bearing 45a side, and the hydraulic oil flows to the bearing 45a side through the oil passage 54, accumulation of the hydraulic oil in the space defined by the transmission case 22, the bearing 45a, the countershaft 40, and the plug 55 can be more reliably suppressed.

As described above, in the power transmission device 20 of the embodiment, the breather chamber 41 having the opening on its one end side and extending coaxially with the countershaft 40 is formed in the countershaft 40 that transmits the power from the output shaft 37 of the automatic transmission 30 to the differential mechanism 39 through the gear mechanism 38, and the inner end 51 of the vent pipe 50 that is placed so as to extend through the transmission case 22 and that includes the inner end 51 and the outer end 52 each having an opening is inserted in the opening of the breather chamber 41. Moreover, the plug 55, which closes the gap between the inner peripheral surface of the breather chamber 41 and the outer peripheral surface of the inner end 51 of the vent pipe 50 so as to allow air to flow between the inside of the transmission case 22 and the breather chamber 41 and so as to restrict entrance of the hydraulic oil into the breather chamber 41, is placed in the opening of the breather chamber 41. This can satisfactorily suppress entrance of the hydraulic oil into the breather chamber 41 regardless of a change in oil level in the power transmission device 20, and thus can more reliably suppress discharge of the hydraulic oil from the breather chamber 41 to the outside of the transmission case 22 through the vent pipe 50.

In the embodiment, the inner end 51 of the vent pipe 50 is inserted in the opening of the breather chamber 41 so as to extend coaxially with the countershaft 40, the gap G is formed around the inner end 51 of the vent pipe 50 by the plug 55, and the plug 55 closely contacts the inner peripheral surface of the breather chamber 41. Thus, entrance of the hydraulic oil into the breather chamber 41 can be more satisfactorily restricted while allowing air to flow between the inside of the transmission case 22 and the breather chamber 41. Moreover, in the embodiment, the countershaft 40 has the plurality of through holes 47 extending from the inner peripheral surface of the breather chamber 41 to the tooth bottom of the drive pinion gear 38c. Thus, even if hydraulic oil flows into the breather chamber 41, the hydraulic oil is first guided to the outer peripheral side in the breather chamber 41 by the gas-liquid separation action by the centrifugal force that is generated by rotation of the countershaft 40. Then, the hydraulic oil can be discharged to the drive pinion gear 38c outside the breather chamber 41 through each through hole 47, and the discharged oil can be used to lubricate the drive pinion gear 38c.

Both ends of the countershaft 40 are rotatably supported by the transmission case 22 via the bearings 45a, 45b, and the discharge port 60 that supplies hydraulic oil to the bearing 45a is provided near the bearing 45a supporting the end of the countershaft 40 which is located on the opening side in which the inner end 51 of the vent pipe 50 is inserted. Thus, the bearing 45a rotatably supporting the countershaft 40 can be satisfactorily lubricated. Even if the discharge port 60 of the hydraulic oil is thus provided near the opening of the countershaft 40 (the breather chamber 41), entrance of the hydraulic oil into the breather chamber 41 can be satisfactorily restricted by placing the plug 55 that closes the gap between the breather chamber 41 and the outer peripheral surface of the vent pipe 50.

The drain port 65 that discharges the hydraulic oil is provided near the discharge port 60 of the transmission case 22. This can more satisfactorily restrict entrance of the hydraulic oil into the breather chamber 41 while avoiding accumulation of the hydraulic oil from the discharge port 60 in the space defined by the transmission case 22, the countershaft 40, the bearing 45a, and the plug 55. Even if the hydraulic oil flows into a region around the vent pipe 50 through the drain hole 65 due to a change in oil level in the power transmission device 20, entrance of the hydraulic oil into the breather chamber 41 can be satisfactorily restricted by the plug 55.

By mounting the lubricating plug 61 having the oil flow hole 61a and the increased diameter portion 61b in the discharge port 60 of the transmission case 22, a proper amount of hydraulic oil can be supplied from the discharge port 60 to the bearing 45a side by adjusting the diameter D1 and the axial length L1 of the oil flow hole 61a and the diameter D2 and the axial length L2 of the increased diameter portion 61b. This can more reliably suppress accumulation of the hydraulic oil in the space defined by the transmission case 22, the countershaft 40, the bearing 45a, and the plug 55. Moreover, if the diameter D1 of the oil flow hole 61a of the lubricating plug 61 is made smaller than the axial length L2 thereof, and the axial length L1 of the oil flow hole 61a is made larger than the axial length L2 of the increased diameter hole 61b as in the embodiment, a more proper pipe resistance can be obtained in the lubricating plug 61, and oil can be supplied from the discharge hole 60 to the bearing 45a while avoiding accumulation of the hydraulic oil in the space defined by the transmission case 22, the countershaft 40, the bearing 45a, and the plug 55.

Correspondence between the primary elements of the embodiment and the primary elements of the invention described in "SUMMARY OF THE INVENTION" will be described below. In the embodiment, the power transmission device 20 including: the automatic transmission 30 as a shift device capable of transmitting power applied to the input shaft 31 to the output shaft 37 by shifting a speed ratio to a plurality of shift speeds by engagement and disengagement of the plurality of clutches C1 to C3 and the brake B1; the differential mechanism 39 that is coupled to the right and left driving wheels DW; the countershaft 40 that transmits the power from the output shaft 37 to the differential mechanism 39; and the transmission case 22 that accommodates the automatic transmission 30, the differential mechanism 39, and the countershaft 40 corresponds to the "power transmission device." The breather chamber 41 formed in the countershaft 40 and having an opening on its one end side corresponds to the "breather chamber." The vent pipe 50 that has the inner end 51 and the outer end 52 each having an opening, that is placed so as to extend through the transmission case 22, and that is inserted in the opening of the breather chamber 41 corresponds to the "vent pipe." The plug 55 that is mounted in the opening of the breather chamber 41 and that closes the gap between the inner peripheral surface of the breather chamber 14 and the outer peripheral surface of the inner end 51 of the vent pipe 50 so as to allow air to flow between the inside of the transmission case 22 and the breather chamber 41 and so as to restrict entrance of the hydraulic oil into the breather chamber 41 corresponds to the "plug." The through hole 47 formed in the countershaft 40 and extending from the inner peripheral surface of the breather chamber 41 to the tooth bottom of the drive pinion gear 38c corresponds to the "through hole."

The correspondence between the primary elements of the embodiment etc. and the primary elements of the invention described in "SUMMARY OF THE INVENTION" is shown by way of example to specifically describe the mode in which the embodiment etc. carries out the invention described in "SUMMARY OF THE INVENTION." Thus, this correspondence is not intended to limit the elements of the invention described in "SUMMARY OF THE INVENTION." That is, the embodiment etc. is merely a specific example of the invention described in "SUMMARY OF THE INVENTION," and the invention described in "SUMMARY OF THE INVENTION" should be construed based on the description therein.

Although the mode for carrying out the invention is described above based on the embodiment, it should be understood that the present invention is not limited in any way to the above embodiment, and various modifications can be made without departing from the spirit and scope of the present invention.

The present invention can be used in the field of manufacturing power transmission devices.

What is claimed is:

1. A power transmission device, comprising:
a shift device that is capable of transmitting power applied to an input shaft to an output shaft by shifting a speed ratio to a plurality of shift speeds by engagement and disengagement of a plurality of hydraulic friction engagement elements; a differential mechanism that is coupled to right and left driving wheels; a countershaft that transmits the power from the output shaft to the differential mechanism; and a case that accommodates the shift device, the differential mechanism, and the countershaft, wherein
a breather chamber having an opening at least on its one end side and extending coaxially with the countershaft is formed in the countershaft,
one end of a vent pipe that is placed so as to extend through the case and that has an opening at its both ends is inserted in the opening of the breather chamber, and
a plug, which closes a gap between an inner peripheral surface of the breather chamber and an outer peripheral surface of the vent pipe so as to allow air to flow between inside of the case and the breather chamber and so as to restrict entrance of oil into the breather chamber, is placed in the opening of the breather chamber.

2. The power transmission device according to claim 1, wherein:
the one end of the vent pipe is inserted in the opening so as to extend coaxially with the countershaft; and
the plug forms a gap around the vent pipe and closely contacts the inner peripheral surface of the breather chamber.

3. The power transmission device according to claim 2, wherein:
a gear is formed on an outer periphery of the countershaft; and
a through hole extending from the inner peripheral surface of the breather chamber to a tooth bottom of the gear is formed in the countershaft.

4. The power transmission device according to claim 3, wherein:
both end portions of the countershaft are rotatably supported by the case via a bearing; and
a discharge port that supplies the oil to the bearing is provided near the bearing supporting the end portion of the countershaft which is located on the opening side in which the one end of the vent pipe is inserted.

5. The power transmission device according to claim 4, wherein:
a drain hole that discharges the oil is provided near the discharge port of the case.

6. The power transmission device according to claim 5, wherein:
a lubricating plug having an oil flow hole is mounted in the discharge port of the case.

7. The power transmission device according to claim 6, wherein:
the oil flow hole of the lubricating plug has a diameter smaller than an axial length of the oil flow hole.

8. The power transmission device according to claim 7, wherein:
the lubricating plug has an increased diameter hole that communicates with the oil flow hole and that opens on the bearing side, and the axial length of the oil flow hole is larger than that of the increased diameter hole.

* * * * *